Patented July 23, 1935

2,009,043

UNITED STATES PATENT OFFICE 2,009,043

PREPARATION OF SOLUTIONS OF SALTS OF PICOLINIC ACID

Miles A. Dahlen and Stanley R. Detrick, Wilmington, Del., assignors to E. I. du Pont de Nemours & Company, Wilmington, Del., a corporation of Delaware No Drawing. Application January 29, 1934, Serial No. 708,930

14 Claims. (Cl. 260—42)

This invention relates to solutions of salts of picolinic acid suitable for catalytic hydrogenation, more particularly it relates to the preparation of said solutions from insoluble picolinic acid salts, such as copper picolinate.

Copper picolinate, which may be given the following formula:

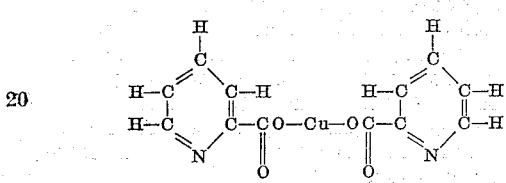

is not a copper salt in the usual sense; rather, it belongs to the class of complex copper salts which produce little cupric ion. The ordinary "double decomposition" which might be expected if the copper salt is merely stirred with cold alkalis does not take place. Other methods of converting the insoluble copper salt to picolinic acid or soluble salts thereof must, therefore, be devised.

In Berichte, 33, 1225-30, there is described the conversion of copper picolinate to free picolinic acid by the action of hydrogen sulfide, the copper being converted to insoluble copper sulfide. Such a process is of little interest for the production of solutions of salts of picolinic acid suitable for catalytic hydrogenation because the picolinic acid thus obtained will almost certainly contain sulfur, probably in the form of sulfides, and such materials are among the worst catalyst poisons.

It is an object of the present invention to provide a new and improved method of converting insoluble salts of picolinic acid to solutions of soluble salts of picolinic acid which are directly suitable for catalytic hydrogenation. Another object is the development of a process whereby insoluble copper picolinate may be converted to the soluble sodium salt. A further object is the production of the sodium salt of picolinic acid in the form of a solution ready for catalytic hydrogenation. A still further object is the development of conditions whereby sodium picolinate solutions may be concentrated without serious decomposition of the material. Other objects will appear hereinafter.

In accomplishing these objects according to this invention, it has been found that copper picolinate may be treated with hot aqueous sodium hydroxide solution, resulting in the following reaction:

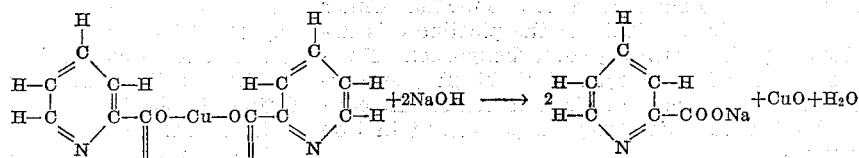

The copper oxide being insoluble, by filtration of the finished reaction mass the sodium picolinate solution may be separated as a clear liquid. This solution, preferably after evaporation to a suitable concentration, may be hydrogenated without any further purification. The copper oxide may be converted to copper sulfate and reused for the production of copper picolinate.

In carrying out the process of the invention, an excess of the strong alkali is normally used. Since it is recognized that sodium picolinate is decomposed upon prolonged heating with strong alkalis, a careful selection of conditions has been developed in order that a maximum yield of sodium picolinate may be realized. It has been found that especially desirable results are obtained when the conditions for treatment with strong alkalis are as follows:

Copper picolinate is stirred with about 5.5 parts by weight of aqueous sodium hydroxide solution of about 8.2% strength at 95° C. to 100° C. for a total of not more than about twenty minutes. The mass is then filtered immediately to remove the precipitated copper oxide and part of the free caustic in the filtrate is neutralized with an acid such as hydrochloric acid.

It is possible to use a smaller quantity of a more concentrated alkaline solution to a given amount of copper picolinate. However, the preferred upper limit is a ratio of one part of copper picolinate to about 3.5 parts of aqueous caustic of about 13% strength. In other words, it is preferable to employ a quantity of the alkali metal hydroxide which is in excess of that theoretically required, preferably about 3 moles per mole of copper picolinate, but the concentration of the alkali metal hydroxide solution should preferably not exceed about 13% by weight. Higher concentrations tend to cause serious destruction of the sodium picolinate. Solutions in which the concentration of alkali metal hydroxide is lower than 8.2% may be used, but this necessitates the evaporation of more water if the solution of the soluble salt of picolinic acid is to be concentrated.

The time of treatment with the strong alkali should be as short as possible, since the degree of decarboxylation of sodium picolinate is a function of the time of heating of the strongly alkaline solution.

The sodium picolinate under the preferred conditions is normally produced as a solution of 13 to 15% strength. The maximum convenient concentration for hydrogen is somewhat greater than this, usually about 20 to 25% strength (that is, in the form of an almost saturated solution). It has been found in accordance with the present invention that this concentration may be effected with a minimum loss of sodium picolinate by alkaline decomposition if evaporation is carried out at a pH of 7. However, it has been found that under these conditions iron surfaces are rapidly corroded by the picolinate solution, iron picolinates being formed. Hence, when the concentration is carried out under these conditions vessels not corroded by the picolinate solution should be used.

It has also been found that the concentration may be carried out at a pH of about 11.5. Under these conditions, a little of the picolinate is destroyed, probably through decarboxylation. However, the loss is not large and at this pH the reaction mass does not corrode iron; hence, the concentration operation may be performed in iron equipment.

The invention will be further understood, but is not limited, by the following examples, in which the quantities are stated in parts by weight.

*Example I*

Add 100 parts of copper picolinate slowly (in ten to fifteen minutes) to 550 parts of an aqueous solution of sodium hydroxide of 8.2% strength at a temperature of about 95° C. to 100° C. Agitate the mass vigorously during the addition and for a period of five minutes longer, then filter while still maintaining the temperature at 95° C. to 100° C. Wash the filter cake with 50 parts of boiling water. To the combined filtrates then add the quantity of hydrochloric acid necessary to adjust the pH value to approximately 11.5, about 50 parts of 31% acid being required.

At this point the product consists of about 725 parts of solution containing 84.5 parts of sodium picolinate. Evaporate the solution to remove 300 parts of water, leaving about 82.5 parts of sodium picolinate in a solution of about 20% strength. This solution is of suitable purity for hydrogenation to yield sodium pipecolinate.

Similarly, the process may be extended to the conversion of copper picolinate to potassium picolinate.

A similar process may be applied to the conversion of other insoluble salts of picolinic acid to the sodium or potassium salt. Special mention may be made of the conversion of calcium picolinate to sodium picolinate, which may be carried out as follows:

*Example II*

Add 100 parts of calcium picolinate slowly, with vigorous agitation, to 400 parts of an aqueous solution of sodium hydroxide of 8.2% strength at 95° C. to 100° C. Agitate the mass for ten to fifteen minutes at this temperature, and then filter. Wash the filter cake with 50 parts of boiling water and add this filtrate to the main filtrate. Adjust the alkalinity of the filtrates to a pH of 11.5 and concentrate by evaporation as described in Example I.

The insoluble salts of picolinic acid, such as copper picolinate, may be obtained by the alkaline oxidation of alpha-picoline by means of a salt of permanganic acid, followed by addition of a suitable precipitating agent such as a solution of copper sulfate. By a combination of this oxidation process and the process of the present invention, alpha-picoline of technical quality may be converted to a solution of sodium picolinate free from catalyst poisons and in a form in which it may be readily hydrogenated to sodium pipecolinate. In the course of the process, sulfur compounds and crude impurities, including alpha-picoline or its oxidation products, are efficiently removed, thereby eliminating the preliminary purification usually performed upon the materials to be hydrogenated. The net yield of the soluble picolinate is higher than in any known process. Sodium pipecolinate obtained by the hydrogenation of sodium picolinate is useful in the manufacture of various organic compounds, particularly azo dyes of the ice color series.

As many apparently widely different embodiments of this invention may be made without departing from the spirit and scope thereof, it is to be understood that we do not limit ourselves to the specific embodiments thereof except as defined in the following claims.

We claim:

1. The process of producing a solution of a soluble salt of picolinic acid suitable for hydrogenation which comprises heating an insoluble salt of picolinic acid with an aqueous solution of an alkali metal hydroxide, filtering, adjusting the pH value of the filtrate to about 11.5, and concentrating the resultant solution by evaporation.

2. The process of producing a solution of sodium picolinate suitable for hydrogenation which comprises heating an insoluble salt of picolinic acid with an aqueous solution of sodium hydroxide of not more than about 13% strength, filtering, adjusting the pH value of the filtrate to about 11.5, and concentrating the resultant solution by evaporation.

3. In a process of producing a solution of an alkali metal picolinate, the step which comprises evaporating a dilute aqueous solution of the alkali metal picolinate at a pH of about 11.5.

4. In a process of producing a solution of sodium picolinate, the step which comprises evaporating a dilute aqueous solution of sodium picolinate at a pH of about 11.5.

5. In a process of producing a solution of sodium picolinate, the step which comprises reacting an insoluble salt of picolinic acid with an aqueous solution of sodium hydroxide of about 8.2% strength at 95° C. to 100° C.

6. The process of producing a solution of a soluble salt of picolinic acid suitable for hydrogenation which comprises heating copper picolinate with an aqueous solution of an alkali metal hydroxide, filtering, adjusting the pH value of the filtrate to about 11.5, and concentrating the resultant solution by evaporation.

7. The process of producing a solution of sodium picolinate suitable for hydrogenation which comprises reacting copper picolinate with an aqueous solution of sodium hydroxide of not more than about 13% strength at 95° C. to 100° C., filtering, adjusting the pH value of the filtrate to about 11.5, and concentrating the resultant solution by evaporation.

8. In a process of producing a solution of sodium picolinate, the step which comprises heating copper picolinate with an aqueous solution of sodium hydroxide of not more than about 13% strength.

9. In a process of producing a solution of sodium picolinate, the step which comprises reacting copper picolinate with an aqueous solution of sodium hydroxide of about 8.2% strength at 95° C. to 100° C.

10. In a process of producing a solution of sodium picolinate, the step which comprises heating copper picolinate with an aqueous solution of sodium hydroxide to a temperature of 95° C. to 100° C., the quantity of sodium hydroxide corresponding to about three moles per mole of copper picolinate and the concentration of the sodium hydroxide solution being about 8.2% to about 13%.

11. The process of producing an aqueous solution of sodium picolinate suitable for hydrogenation which comprises adding copper picolinate slowly to an aqueous solution of sodium hydroxide of about 8.2% strength at a temperature of 95° C. to 100° C., stirring the mass vigorously during the addition and for a priod of about five minutes longer, then filtering while still maintaining the temperature at 95° C. to 100° C., washing the filter cake with boiling water to displace adhering mother liquor, adding to the combined filtrates the quantity of hydrochloric acid required to adjust the pH to approximately 11.5, and evaporating the solution to 20% sodium picolinate.

12. The process of producing a solution of sodium picolinate suitable for hydrogenation which comprises slowly adding 100 parts of copper picolinate to 550 parts of an aqueous solution of sodium hydroxide of about 8.2% strength at a temperature of 95° C. to 100° C., agitating the mass vigorously during the addition and for a period of five minutes longer, then filtering while still maintaining the temperature at 95° C. to 100° C., washing the filter cake with 50 parts of boiling water, adding to the combined filtrates about 50 parts of hydrochloric acid of 31% strength, and evaporating to a solution of about 20% sodium picolinate.

13. In a process of producing a solution of sodium picolinate suitable for hydrogenation, the step which comprises heating an insoluble salt of picolinic acid with an aqueous solution of sodium hydroxide of not more than about 13% strength.

14. The process of producing a solution of sodium picolinate suitable for hydrogenation which comprises heating copper picolinate with an aqueous solution of sodium hydroxide of not more than about 13% strength, filtering, adjusting the pH value of the filtrate to about 11.5, and concentrating the resultant solution by evaporation.

MILES A. DAHLEN.
STANLEY R. DETRICK.